(12) United States Patent
Hopkins

(10) Patent No.: US 10,666,089 B2
(45) Date of Patent: May 26, 2020

(54) RESERVOIR RECOVERY ENERGY FLUX COUPLING CELL, UNIT, SYSTEMS, AND METHOD

(71) Applicant: Michael Hopkins, Discovery Bay, CA (US)

(72) Inventor: Michael Hopkins, Discovery Bay, CA (US)

( * ) Notice: Subject to any disclaimer, the term of this patent is extended or adjusted under 35 U.S.C. 154(b) by 966 days.

(21) Appl. No.: 15/116,206

(22) PCT Filed: Feb. 3, 2015

(86) PCT No.: PCT/US2015/014189
§ 371 (c)(1),
(2) Date: Aug. 2, 2016

(87) PCT Pub. No.: WO2015/119916
PCT Pub. Date: Aug. 13, 2015

(65) Prior Publication Data
US 2019/0237998 A1    Aug. 1, 2019

Related U.S. Application Data

(60) Provisional application No. 61/965,577, filed on Feb. 4, 2014.

(51) Int. Cl.
*H02J 50/05* (2016.01)
*H02J 50/10* (2016.01)
*H02J 7/02* (2016.01)
*H02J 50/00* (2016.01)
*H02J 50/20* (2016.01)
*H02M 7/06* (2006.01)

(52) U.S. Cl.
CPC .............. *H02J 50/05* (2016.02); *H02J 50/00* (2016.02); *H02J 50/10* (2016.02); *H02J 50/20* (2016.02); *H02M 7/06* (2013.01)

(58) Field of Classification Search
USPC ........................................................ 307/104
See application file for complete search history.

(56) References Cited

U.S. PATENT DOCUMENTS

| | | | | |
|---|---|---|---|---|
| 2,897,413 A | * | 7/1959 | Hodges | H02H 3/04 361/160 |
| 3,760,255 A | * | 9/1973 | Grodinsky | G06G 7/25 327/104 |
| 2008/0157883 A1 | * | 7/2008 | Li | H03B 21/025 331/37 |
| 2010/0084920 A1 | * | 4/2010 | Banting | G01R 15/142 307/66 |

FOREIGN PATENT DOCUMENTS

| | | | |
|---|---|---|---|
| EP | 0902442 | * | 3/1999 |
| EP | 0909017 | * | 4/1999 |

* cited by examiner

*Primary Examiner* — Rexford N Barnie
*Assistant Examiner* — Xuan Ly
(74) *Attorney, Agent, or Firm* — Patrick E. Caldwell, Esq.; The Caldwell Firm, LLC

(57) ABSTRACT

The disclosed embodiments relate to a current recovery cell, unit, and system that enhances signal admittance and captures bipolar and uni-polar electro-magnetic and electro-static energy flux generated by input AC High Frequency Impulse currents, bandwidth adjusts selects, and converts this captured energy flux to uni-polar currents, thereby recovering input AC Impulse currents for system power reduction.

18 Claims, 13 Drawing Sheets

RESERVOIR RECOVERY ENERGY FLUX COUPLING CELL, UNIT, SYSTEMS, AND METHOD

TECHNICAL FIELD

The present invention relates generally to the field of energy harvesting and dynamic power reduction in electronic circuits and, more particularly, to an improved reservoir recovery energy flux coupling cell, unit, systems, and method.

BACKGROUND

The embodiments disclosed herein relates to energy harvesting and dynamic power reduction in circuits that operate in switch mode, transitioning between on and off states, and circuits that possess analog high speed slew rates. Specifically, the disclosed embodiments operate on the principle of harvesting energy flux fields from moving electronic charges that are the result of charging or discharge currents, capturing the above said flux fields, reprocessing them for the purpose of dynamic power reduction of impulses or signals that originally produced the moving electronic charges, and/or utilizing them in charging an external storage device.

Dynamic power reduction is a primary goal of most electronic designs. Efforts made to achieve power reduction range from methodologies that reduce the minimum feature size of electronic manufacturing processes, thus minimizing the parasitic capacitances in process devices, enabling circuit supply voltages to be reduced; to strategically and actively enabling and disabling certain sections of circuits (burst mode processing), during circuit operation to reduce unneeded power dissipation. These methods can be quite expensive to implement, in that, to accomplish this implementation, one must redesign circuits, requiring expensive changes to existing architectures.

An alternative approach is to attempt to capture RF, heat, or other energies emitted by the moving electronic charges in circuit designs, converting these radiated energies into useful power that can ease the current draw from system sources. Many methodologies and circuits presently exist to achieve the above, but these existing methodologies and circuits do not tap into the circuit root causes of dynamic power dissipation. Radiated energy harvesting methodologies and circuits rely on capturing relatively low magnitude, medium to far field radiated energies from circuits and structures, thus relegating the above mentioned methods low in efficiency and low actual energy harvesting capability, thus limited usefulness.

The disclosed embodiments tap the root cause of dynamic power dissipation. Certain disclosed embodiments capture and harvest these radiated and close proximity integrated circuit electronic flux fields that are created by moving electronic charge or current, allowing captured electromagnetic and electro-static flux to generate currents that are fed back into the system, thus reducing the power drawn from power sources used to supply power to electronic circuits, and/or utilized to charges external devices.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

In one embodiment, a single flux capturing and coupling cell, unit, and system is described, having cell inputs and output driven by the same or identical voltage signals, this causing current to flow into the cell input, the cell having two reversible polarity, current mode input ports with input flux cancellation, directing and enhancing radiated flux, reducing input impedance and increasing signal admittance, thus allowing higher currents to be admitted to the said input. This enhanced radiated energy flux is captured and converted to voltage and current signals, applied to a bandwidth, amplitude scaling and shifting function, directed and rectified, such that, a unidirectional current is allowed to flow out of the cell output. This said output current is additive to the amount or magnitude of current demanded by the circuit load, thus reducing the amount of current demanded and flowing from circuit supplies, and/or is utilized to charge an external storage element.

In another embodiment, a single flux capturing and coupling cell, unit, and system is described, having cell inputs and output driven by varying polarity, magnitude, and phase voltage signals, this causing current to flow into the cell input, the cell having two reversible polarity, current mode input ports with input flux cancellation, directing and enhancing radiated flux, reducing input impedance and increasing signal admittance, thus allowing higher currents to be admitted to the said input. This enhanced radiated energy flux is captured and converted to voltage and current signals, applied to a bandwidth, amplitude scaling and shifting function, directed and rectified, such that, a unidirectional current is allowed to flow out of the cell output. This said output current adds to the amount or magnitude of current demanded by the circuit load, reducing the amount of current demanded and flowing from circuit supplies, and/or is utilized to charge an external storage element.

In another embodiment, multiple, parallel flux capturing and coupling cells, units, and system are described, having cell inputs and outputs driven by the same, identical voltage signals, and/or varying polarity, magnitude, and phase voltage signals, thus causing current to flow into the cell inputs, the cells having two reversible polarity, current mode input ports with input flux cancellation, directing and enhancing radiated flux, reducing input impedance and increasing signal admittance, thus allowing higher currents to be admitted to the input. This enhanced radiated energy flux is captured and converted to voltage and current signals, applied to individual bandwidth, amplitude scaling and shifting cell functions, directed and rectified, such that, a unidirectional current is allowed to flow out of the cell outputs. This said combined cell output current is additive to the amount or magnitude of current demanded by the circuit load, thus reducing the amount of current demanded and flowing from circuit supplies, and/or is utilized to charge an external storage element.

BRIEF DESCRIPTION OF THE DRAWINGS

The accompanying drawings, which are incorporated in and constitute a part of the specification, illustrate various embodiments and concepts of the invention and, together with a general description of the invention given above and the detailed description of the embodiments given below, serve to explain the embodiments of the invention.

DETAILED DESCRIPTION

Figure 1:
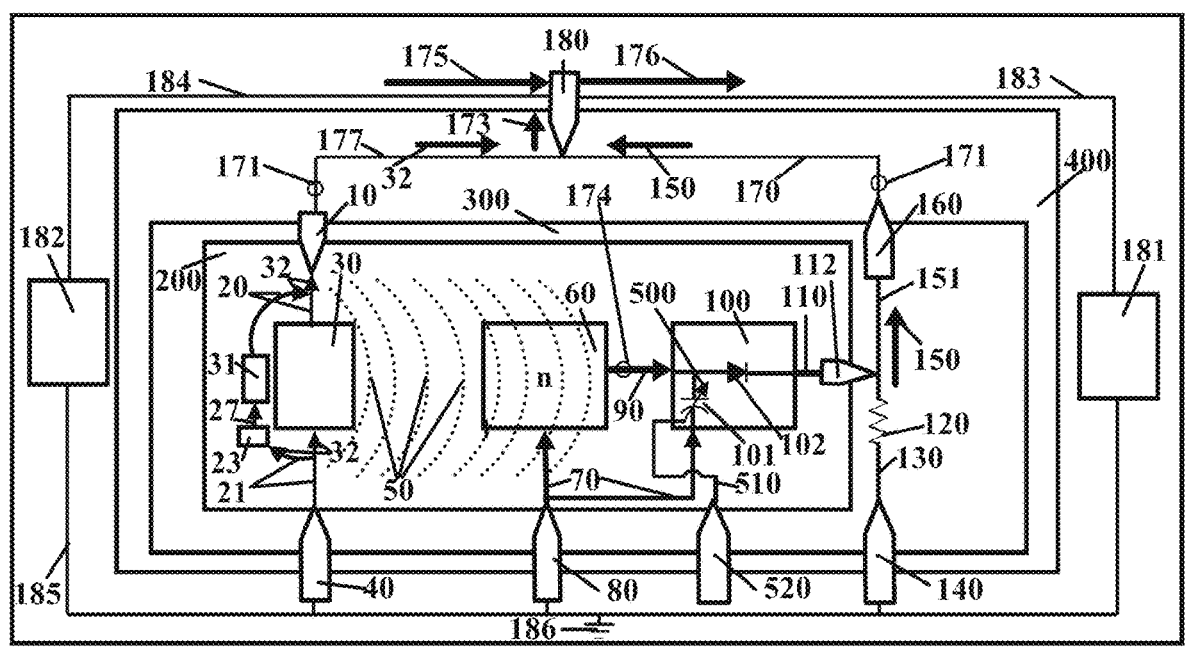
FIG. 1 is a block diagram of the preferred embodiment of a single cell and function of the invention.

FIGS. 1 through 4 detail the preferred embodiment of Reservoir Recovery Energy Flux Coupling System 400. Alternating Current and Voltages applied at reservoir recovery input 180 are applied via AC coupling means 177 and connecting means 170 to reservoir recovery energy port 10 and output port 160, respectively, of Reservoir Recovery Energy Flux Coupling Cell 200. Said Alternating Current and Voltages applied at reservoir recovery input 180 and transferred via AC coupling means 177 to port 10 of Reservoir Recovery Energy Flux Coupling Cell 200, are transferred to alternating current input device (ACID) 30 and flux cancellation/impedance reduction device 31 via connecting wire 20. Impedance reduction/flux cancellation device 31 is connected to impedance reduction current control device 23 via connecting wire 27. Alternating current input device (ACID) 30 and impedance reduction current control device 23 are connected to reservoir recovery energy port 40 via connecting wire 21.

Figure 7:
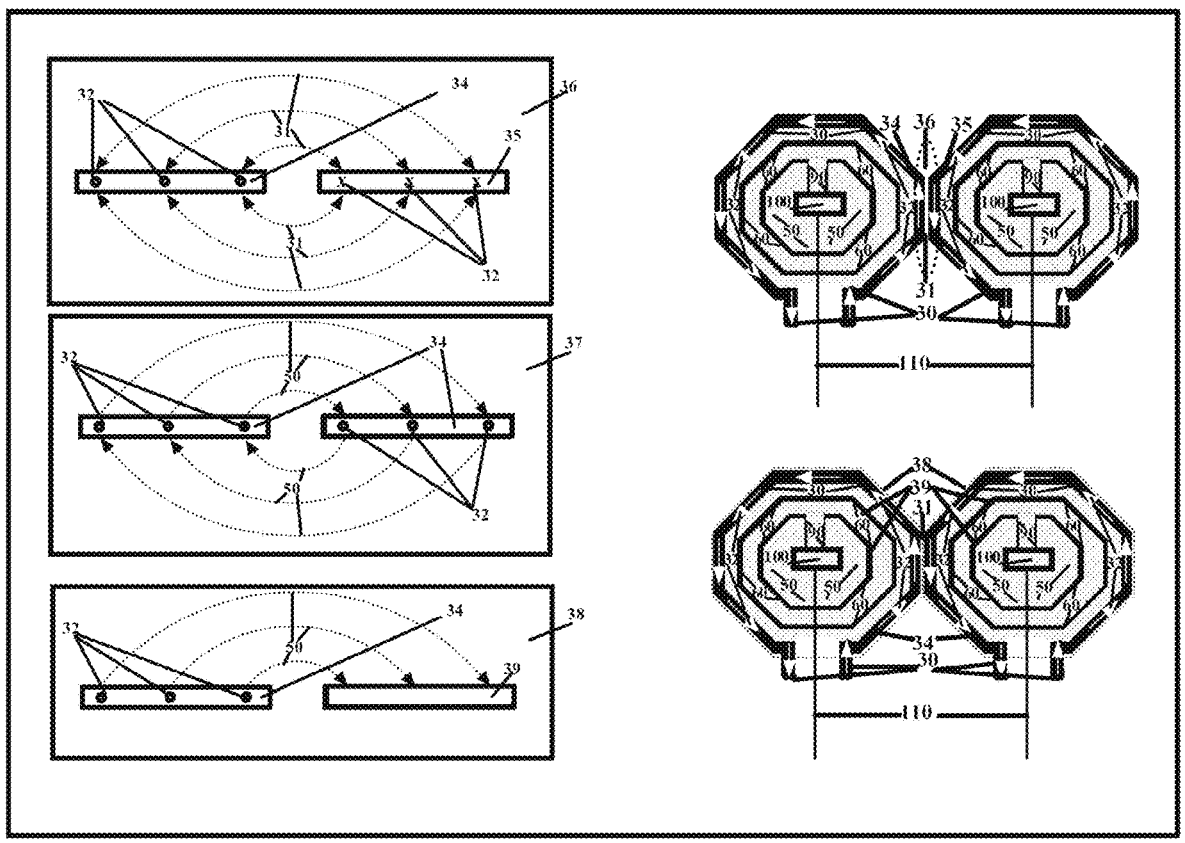
FIG. 7 is a flux coupling diagram of the flux cancellation and enhancement mechanisms of the preferred, second, and third embodiment of the invention.

Currents flowing in opposite directions in close proximity parallel structures, are known to cancel and reduce electron flow in each structure, thus reducing energy flux, inductance, and circuit impedance. Currents flowing in the same direction in close proximity parallel structures, are known to induce electron flow in the each structure, thus energy transfer occurs, and inductance and circuit impedances increase. This phenomenon is shown graphically in FIG. 7. In FIG. 7, structure 34 of proximity structures 36, 37, and 38 contains current 32 that has a direction that is flowing into the page. Structure 35 of proximity structure 36 contains current 32 that has a direction that is flowing out of the page. Structure 39 of proximity structure 38 contains no current 32.

As structures 34 and 35 are brought into close proximity, as in proximity structure 36, flux cancellation/impedance reduction device 31 is activated. Conversely, as two structure 34 elements or structure 34 and 39 elements are brought into close proximity, as in proximity structures 37 and 38, flux coupling device 50 is activated, and energy transference is achieved.

AC current 32 in FIGS. 1 through 7 denotes arbitrarily one of the possible 2 directions or polarities of this applied alternating current. AC current 32 may conversely be applied to reservoir recovery energy port 40, as shown in FIGS. 3 through 6, in like manner, as is described, to reservoir recovery energy port 10 of FIGS. 1 and 2, or simultaneously to both reservoir recovery energy ports 10 and 40 in FIGS. 5 and 6.

Referring again to Reservoir Recovery Energy Flux Coupling Cell 200 in FIGS. 1 through 6, Alternating current 32 in applied to either or both port 10 and/or 40, enables alternating current input device (ACID) 30 to generate and activate current based electro-static and/or electro-magnetic flux energy device 50 which is applied to energy flux receiving device (EFRD) 60, and enables energy flux receiving device (EFRD) 60 to generate a unipolar or bipolar voltage and current at connecting wire(s) 90 proportional to the factor n (relative to alternating current input device (ACID) 30) of energy flux receiving device (EFRD) 60. Energy flux receiving device (EFRD) 60 is connected to system voltage potentials via connecting wire 70 and harvesting port 80.

In FIGS. 1 through 6, voltage and currents on connecting wire(s) 90 generated by energy flux receiving device (EFRD) 60, are applied to bandwidth-amplitude shifting rectification device (BASRD) 100. Bandwidth-amplitude shifting rectification device (BASRD) 100 adjusts the bandwidth of the signals received from connecting wires(s) 90, utilizing bandwidth adjusting device 101, interfacing to connecting wire 70 and connecting wires(s) 90. Control port 520 interfaces to connecting wire 510 that controls bandwidth/magnitude-amplitude adjustment means 500, which allows controlled bandwidth signals to be passed to rectifying device 102. Bandwidth-amplitude shifting rectification device (BASRD) 100 creates unipolar voltages and currents, utilizing rectifying device 102, excited by the voltage and current applied via connecting wire(s) 90 and connecting wire 110, with said bandwidth-amplitude shifting rectification device (BASRD) 100, outputting said unipolar voltages and currents on connecting wire 110 and output port 112 of Reservoir Recovery Energy Flux Coupling Cell 200. Generated unipolar voltage and current is applied to Reservoir Recovery Energy Flux Coupling Unit 300 high impedance biasing device (HIBD) 120 and low impedance output port 160 via connecting wire 151. High impedance biasing device (HIBD) 120 is connected to system potentials via connecting wire 130 and harvesting port 140. High impedance biasing device (HIBD) 120 causes unipolar current 150, created by bandwidth-amplitude shifting rectification device (BASRD) 100, to flow out of low impedance output port 160.

Figure 13:
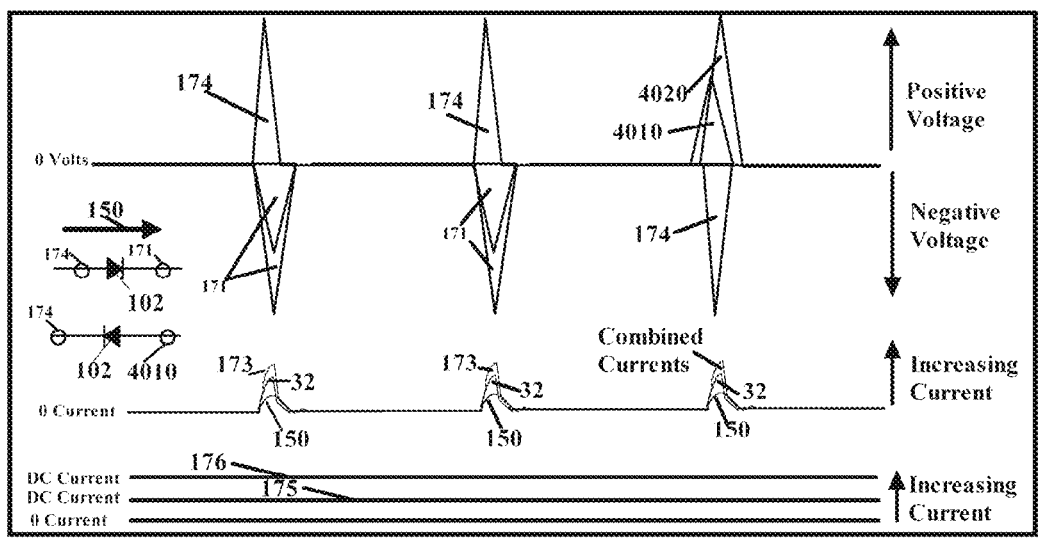
FIG. 13 is a functional example diagram of the operation of all the embodiments of the invention.

FIG. 13 is a graphical example of the power-current harvesting and reduction action of Reservoir Recovery Energy Flux Coupling Unit 300 and Reservoir Recovery Energy Flux Coupling System 400 and 3000. FIGS. 1 through 4, 9. and 10 show average DC currents 175 and 176 flowing into and out of Reservoir Recovery Energy Flux Coupling System 400 and 3000 input 180, respectively. As shown in FIG. 13, average DC current 175 flowing from the source is substantially lower than average DC current 176 flowing to system load 181. This average DC load current 176, the current demanded by system load 181, is partially being supplied by the flux capturing action of the alternating current input device (ACID) 30 and flux cancellation/impedance reduction device 31 of Reservoir Recovery Energy Flux Coupling Cell 200, activated by the flow of current 32. The flow of AC current 32 is enhanced by the action of flux cancellation/impedance reduction device 31, allowing more AC current to flow into the input of alternating current input device (ACID) 30, increasing flux density in transfer flux energy device 50, enhancing the voltage and current output of energy flux receiving device (EFRD) 60, increasing the magnitude of signal 174.

Figure 2:
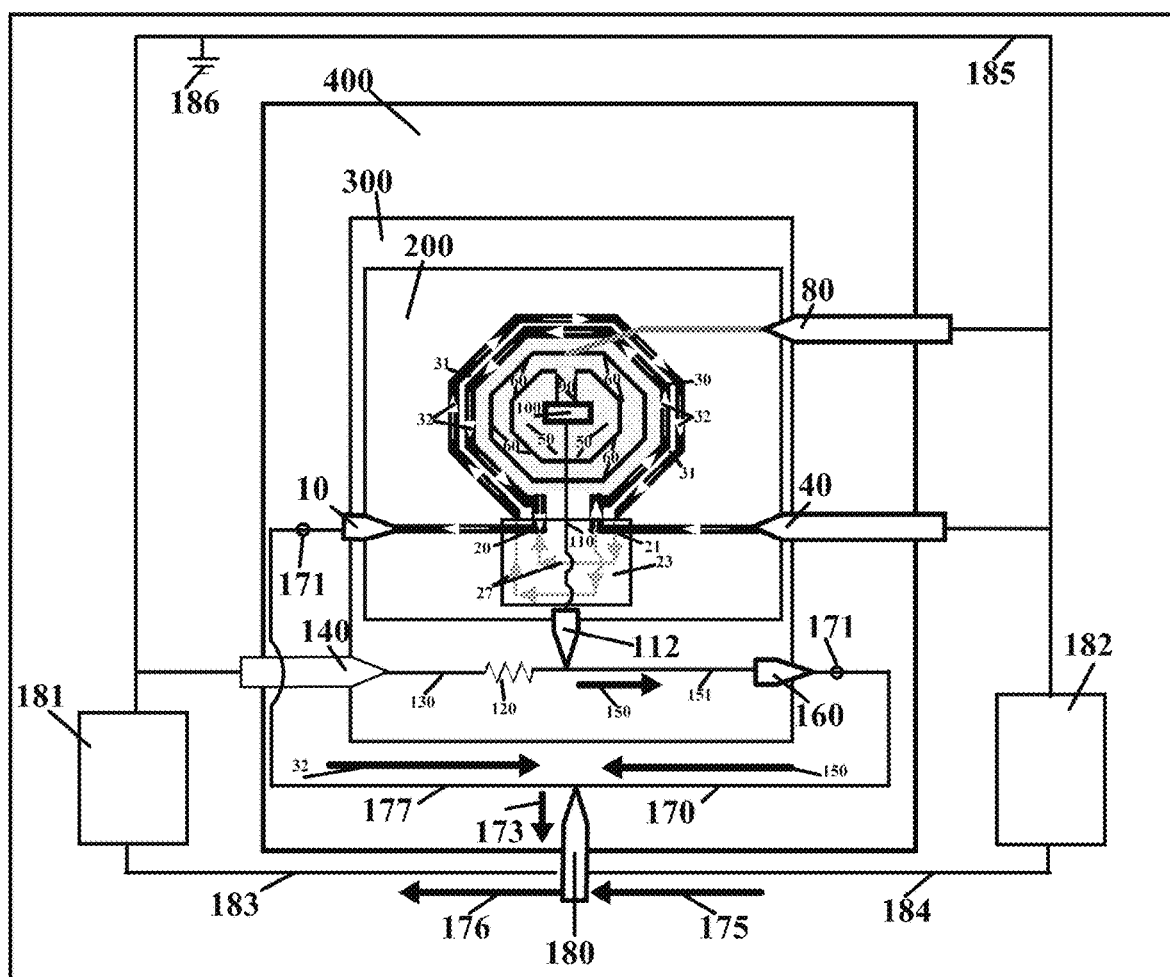
FIG. 2 is a structural and functional diagram of the preferred embodiment of the invention shown in FIG. 1.
Figure 3:
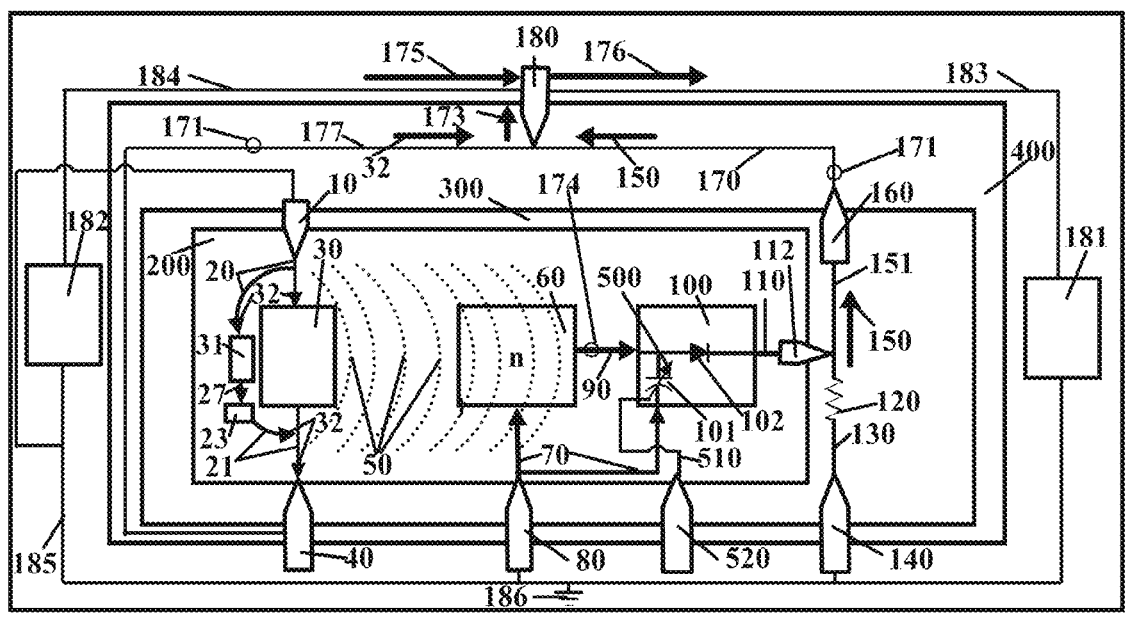
FIG. 3 is a block diagram of the preferred embodiment of a single cell and function of the invention with inverted inputs.
Figure 4:
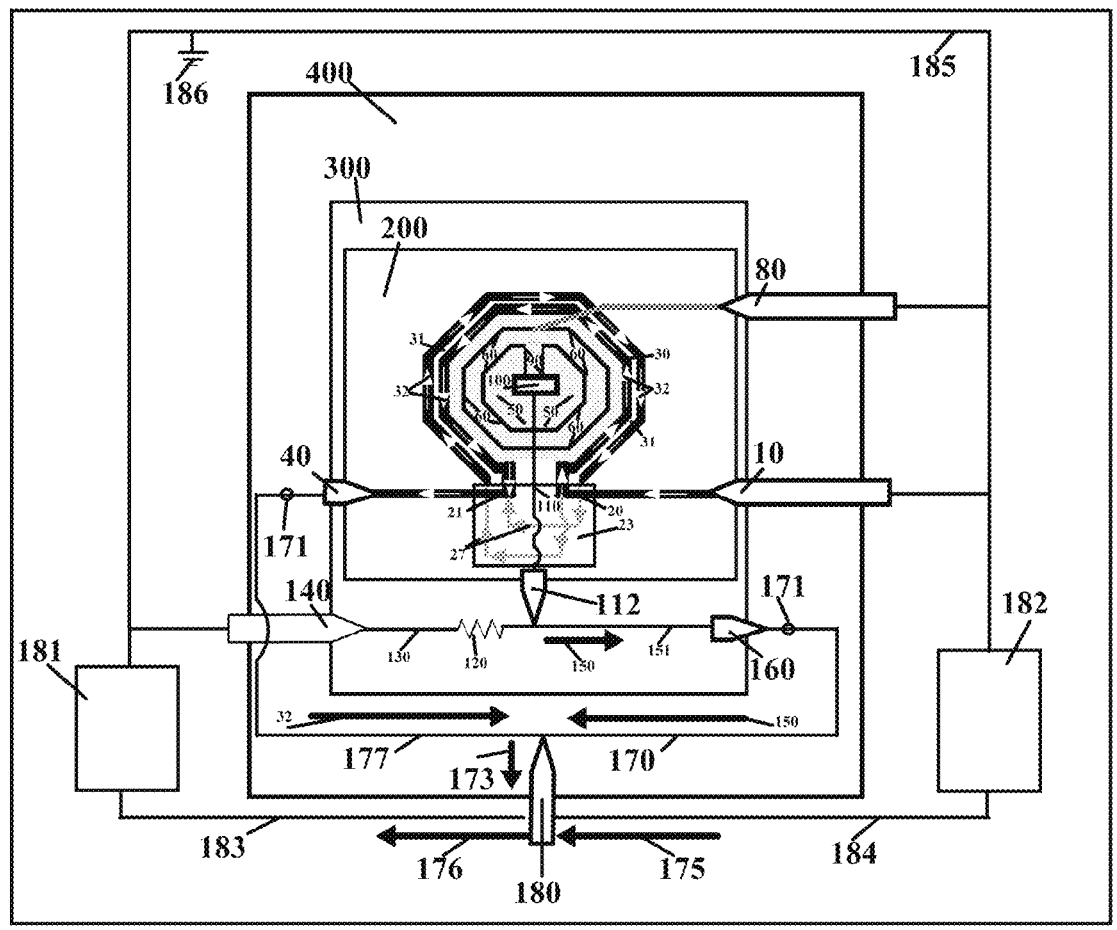
FIG. 4 is a structural and functional diagram of the preferred embodiment of the invention with inverted inputs shown in FIG. 3.
Figure 9:
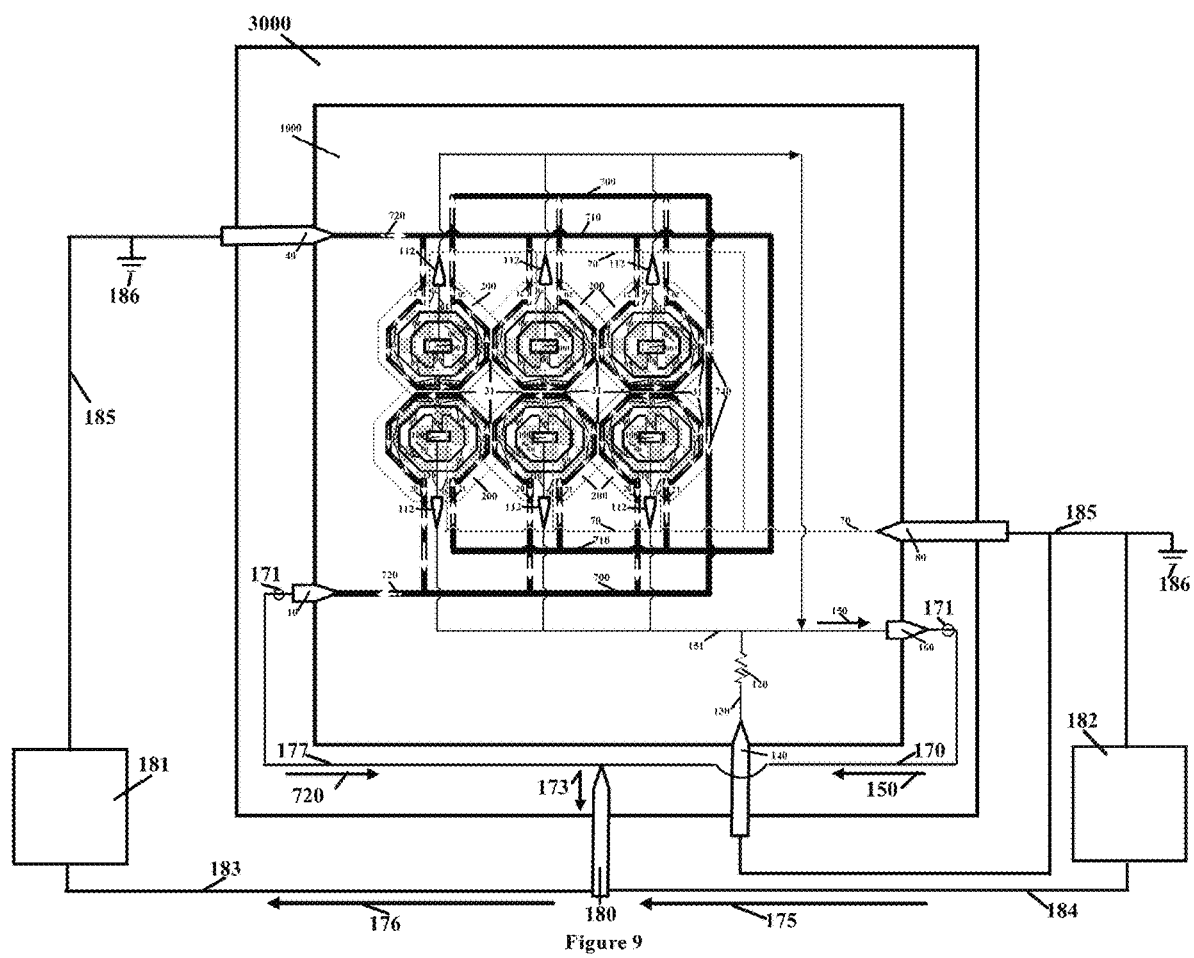
FIG. 9 is a structural and functional diagram of the third embodiment of the invention consisting of multiple embodiments of the preferred embodiment of the invention shown in FIGS. 2, 4, and 6.
Figure 10:
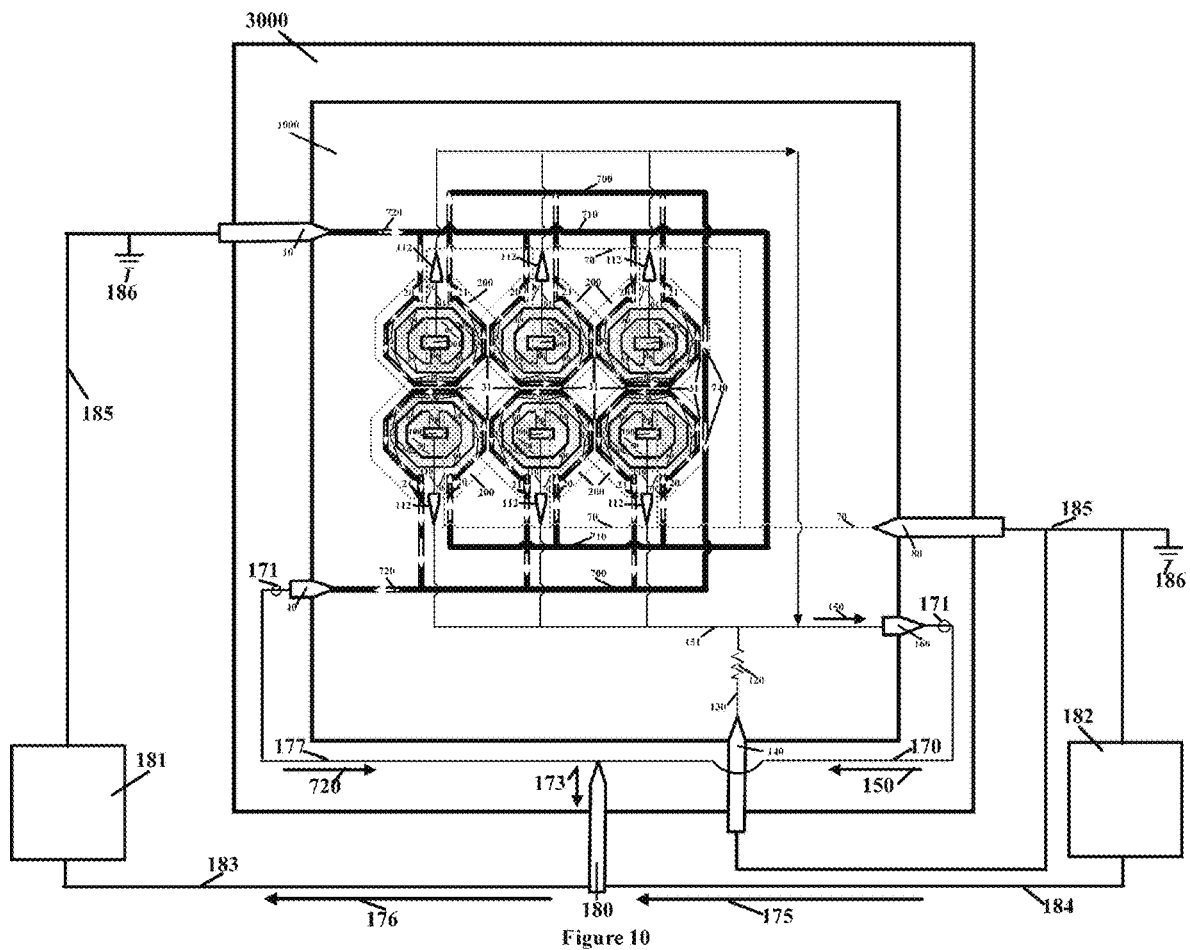
FIG. 10 is a structural and functional diagram of the third embodiment of the invention with inverted inputs consisting of multiple embodiments of the preferred embodiment of the invention shown in FIGS. 2, 4, and 6.

As shown in FIGS. 1 through 4, 9, 10, and 13, input Alternating Current and Voltages 171 are input at reservoir recovery input 180 and are applied to AC coupling means 177, and thereby applied to reservoir recovery energy port 10 in FIGS. 1, 2, and 9, and reservoir recovery energy port 40 in FIGS. 3, 4, and 10. Input Alternating Current and Voltage 171 applied at reservoir recovery input 180 and is applied to connecting means 170, is also applied to output port 160 of Reservoir Recovery Energy Flux Coupling Cell 200 as shown in FIGS. 1 through 4, 9, and 10. This action places signal 171 at the connecting wire 110 and the anode or cathode of rectifying device 102 of each Reservoir Recovery Energy Flux Coupling Cell 200, and the flux coupling action of each Reservoir Recovery Energy Flux Coupling Cell 200 generates signal 174 shown in FIGS. 1 through 6 and 13 that is applied to connecting wires(s) 90 and the anode or cathode of rectifying device 102. As the result of the applied signals 171 and 174, current 150 of Reservoir Recovery Energy Flux Coupling Unit 300 and 1000, is produced and is added to input AC current 32 of Reservoir Recovery Energy Flux Coupling System 400 and 3000, creating combined AC current 173 of Reservoir Recovery Energy Flux Coupling Systems 400 and 3000. Reservoir Recovery Energy Flux Coupling System 400 and 3000 current 173 increases average load current 176, flowing to load device 181 via connecting means 183, lessening the need for average current 175 which is applied to Reservoir Recovery Energy Flux Coupling System 400 and 3000 port 180, via connecting means 184 from the system source 182. Thus, the flux energy 50, that is usually wasted by the reservoir current flow demanded by load device 181 is captured and utilized to reduce overall system current and power drawn from system source 182. It is further described that ground potential 186 is applied to connecting means 185 which connects to system source 182, load device 181, ports 80, and 140 in FIGS. 1 through 4, 9, and 10. Further, port 40 in FIGS. 1, 2, and 9 is connected to connecting means 185 and port 10 is connected to connecting means 185 in FIGS. 3, 4 and 10.

Figure 5:
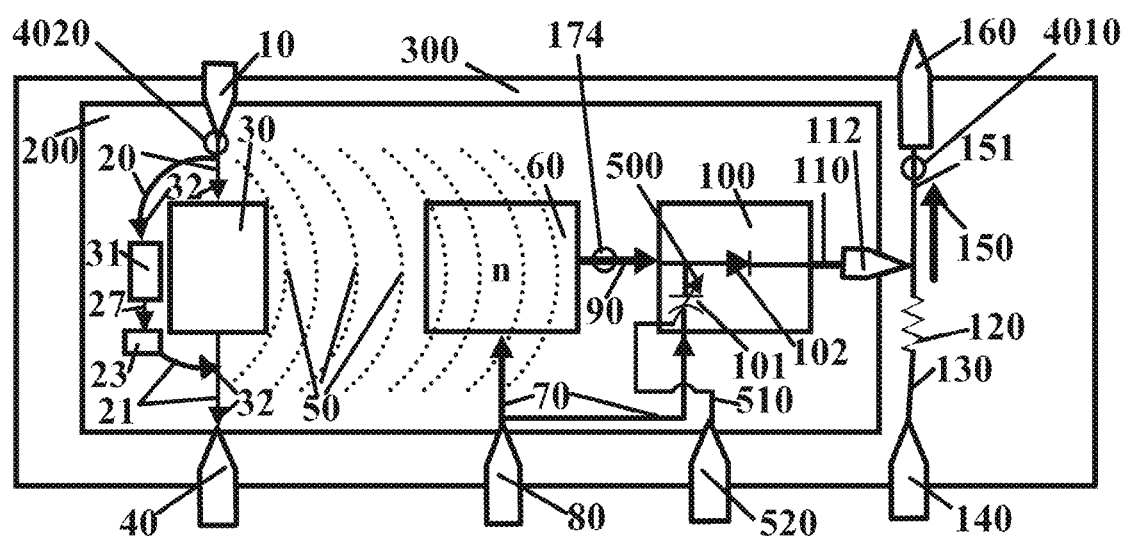
FIG. 5 is a block diagram of the second embodiment of the invention showing the capability of varying magnitudes, phases, and polarities of directing voltages driving the Inputs and outputs of the invention.
Figure 6:
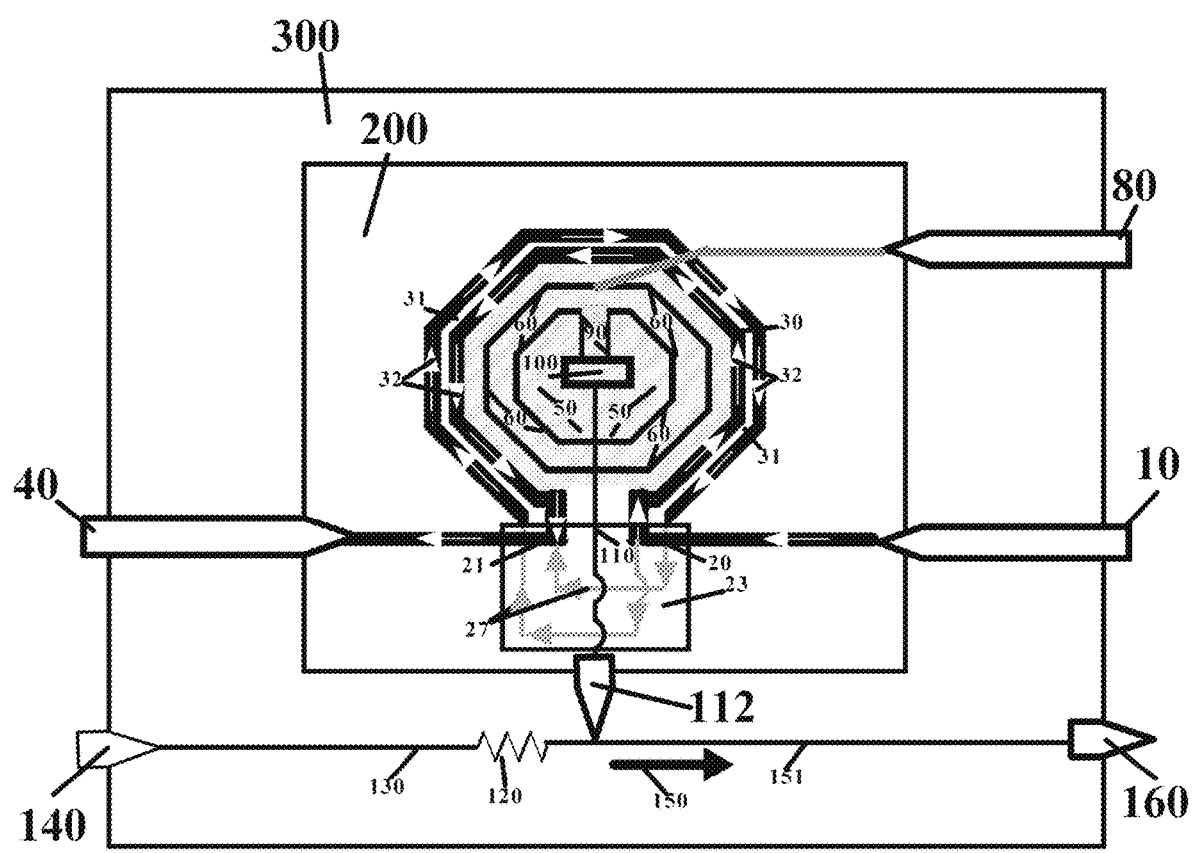
FIG. 6 is a structural and functional diagram of the second embodiment of the invention shown in FIG. 5.

FIGS. 5 and 6 show an embodiment of the invention that is the same structurally as the invention embodiments of Reservoir Recovery Energy Flux Coupling Unit 300 shown in FIGS. 1 through 4. The function of the FIGS. 5 and 6 embodiments is identical to that of FIGS. 1 through 4, 9, and 10 even though the signal 4020 input at port 10 of FIGS. 5 and 6 is different in magnitude and phase than signal 4010 applied to Reservoir Recovery Energy Flux Coupling Unit 300 output port 160.

FIG. 13 graphically shows and example of this function. In FIGS. 5 and 6, signal 4020 is applied to port 10 of Reservoir Recovery Energy Flux Coupling Unit 300, and signal 4010 is applied to Reservoir Recovery Energy Flux Coupling Unit 300 output port 160. Signals 4010 and 4020 are shown as the same polarity, but different magnitudes and phases in FIG. 13. The relative polarity of signals 4010 and 4020 can also be varied (not shown) to achieve the same current mode results shown in FIG. 13.

As in the invention embodiments in FIGS. 1 through 4, signal 174 of Reservoir Recovery Energy Flux Coupling Unit 300 of FIGS. 5 and 6 is generated by the same action, mechanisms, and structures described in the preferred embodiment of the invention shown in FIGS. 1 through 4, forcing signal voltages 4010 and 174 across rectifying device 102, causing unipolar current 150 to flow to connecting wire 151 and out of port 160 of Reservoir Recovery Energy Flux Coupling Unit 300. Current 150 can be utilized to charge and external device or combined with current 32 to form and increased magnitude current as shown in FIG. 13. It should be noted that signal 4010 can be DC or AC, with any relative polarity, magnitude, or phase that causes voltage differential across rectifying device 102, thus causing current to flow through rectifying device 102 and out through output port 160.

As in FIGS. 1 through 4, signal 4020 may be applied to port 40 in like manner as it was applied to port 10 in FIGS. 5 and 6, achieving the same flux coupling and current generating results as in the embodiments of FIGS. 1 through 4.

Figure 8:
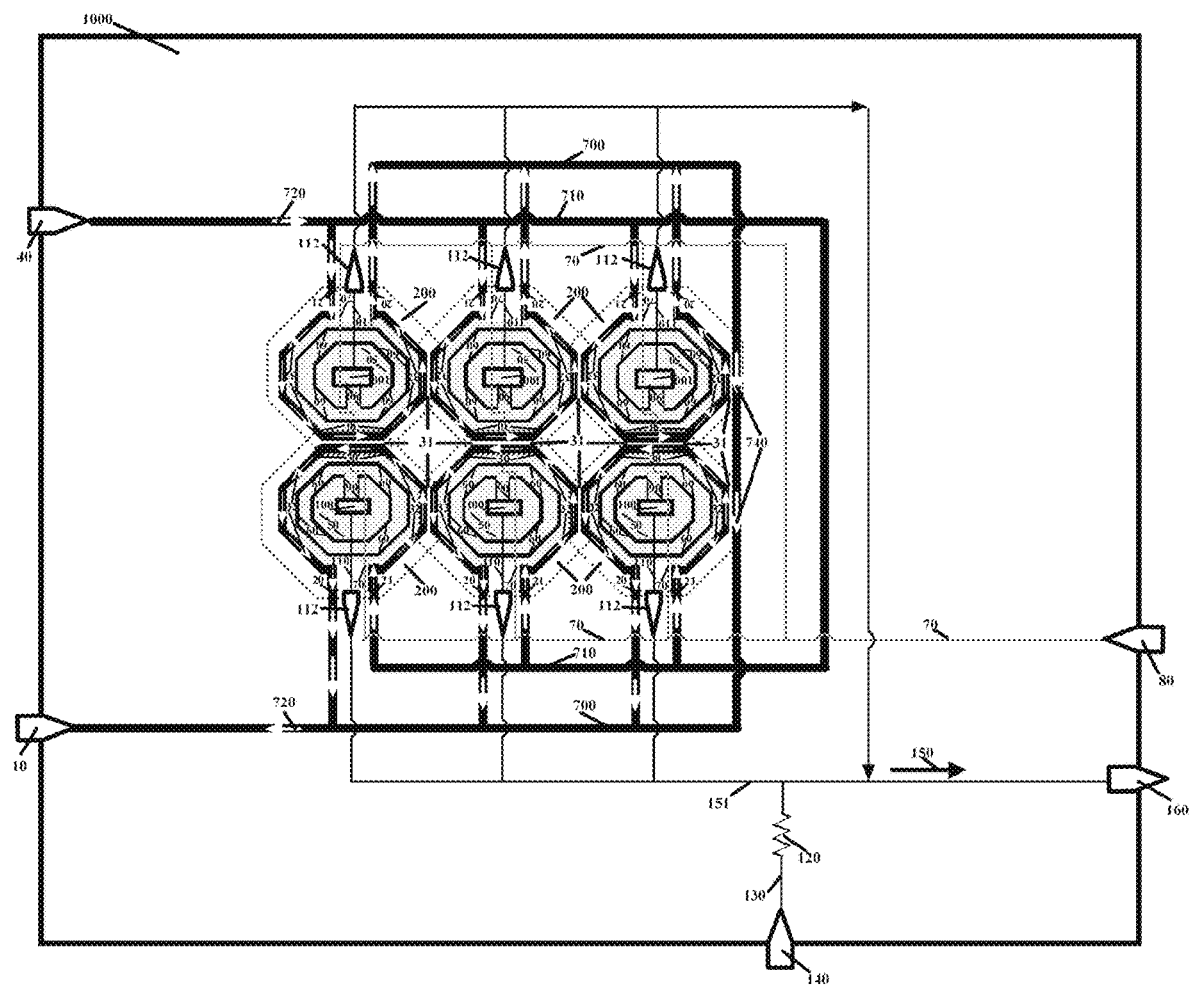
FIG. 8 is a structural diagram of the third embodiment of the invention consisting of multiple embodiments of the preferred embodiment of the invention shown in FIGS. 2, 4, and 6 of the invention.

Multiples of the Reservoir Recovery Energy Flux Coupling Cell 200, described in FIGS. 1 through 4, may be connected in parallel, as shown in the Multiple Reservoir Recovery Energy Flux Coupling System 1000 embodiment shown in FIGS. 8 through 10.

In the FIGS. 8 through 10 embodiment, connecting wires 20 and 21 of each Reservoir Recovery Energy Flux Coupling Cell 200 are parallel connected via connecting bus 700 and 710 to connect to the ports 40 and 10, respectively, of Multiple Reservoir Recovery Energy Flux Coupling System 1000.

Currents flowing in opposite directions in close proximity parallel structures, are known to cancel and reduce electron flow in each structure, thus reducing energy flux, inductance, and circuit impedance. Currents flowing in the same direction in close proximity parallel structures, are known to induce electron flow in the each structure, thus energy transfer occurs, and inductance and circuit impedances increase. This phenomenon is shown graphically in FIG. 7. In FIG. 7, structure 34 of proximity structure 36, 37, and 38 contains current 32 that has a direction that is flowing into the page. Structure 35 of proximity structure 36 contains current 32 that has a direction that is flowing out of the page. Structure 39 of proximity structure 38 contains no current 32.

As structures 34 and 35 are brought into close proximity, as in proximity structure 36, flux cancellation/impedance reduction device 31 is activated. Conversely, as two structure 34 elements or structure 34 and 39 elements are brought into close proximity, as in proximity structures 37 and 38, flux coupling device 50 is activated, and energy transference is achieved.

Referring again to Multiple Reservoir Recovery Energy Flux Coupling System 1000 shown in FIGS. 8 through 10, AC currents 32, 720, and 740 denote arbitrarily one of the possible 2 directions or polarities of the applied alternating current applied to ports 40 and 10, distributed to and collected from each Reservoir Recovery Energy Flux Coupling Cell 200. Multiple Reservoir Recovery Energy Flux Coupling System 1000, shown in FIGS. 8 through 10, shows the areas of impedance reduction/flux cancellation device 31 activation, which are the portions of the individual Reservoir Recovery Energy Flux Coupling Cell 200 devices that have substantially equal currents 32 and 740 flowing in opposite directions in close proximity structures, that being the alternating current input device (ACID) 30 of each Reservoir Recovery Energy Flux Coupling Cell 200 device and connecting bus 700. AC current 720 may conversely be applied to reservoir recovery energy port 40 in like manner as is described to reservoir recovery energy port 10 or simultaneously to both reservoir recovery energy ports 10 and 40.

In FIGS. 8 through 10, connecting wire 70 connects to port 80 of Multiple Reservoir Recovery Energy Flux Coupling System 1000 and port 160 is connected to connecting wire 151 and to each connecting wire 110 via port 112 of each Reservoir Recovery Energy Flux Coupling Cell 200. High impedance biasing device (HIBD) 120 in Multiple Reservoir Recovery Energy Flux Coupling Cells 1000 connects to low impedance output port 160 and to system potentials via connecting wire 130 and harvesting port 140. High impedance biasing device (HIBD) 120 causes unipolar current 150 created by bandwidth-amplitude shifting rectification device (BASRD) 100 of each Reservoir Recovery Energy Flux Coupling Cell 200 to flow out of low impedance output port 160.

The individual Recovery Energy Flux Coupling Cell 200 of Multiple Reservoir Recovery Energy Flux Coupling System 1000 embodiment of FIGS. 8 through 10 allows wide bandwidth adjustability of Multiple Reservoir Recovery Energy Flux Coupling System 1000 via port 520 of each Recovery Energy Flux Coupling Cell 200.

Figure 11:
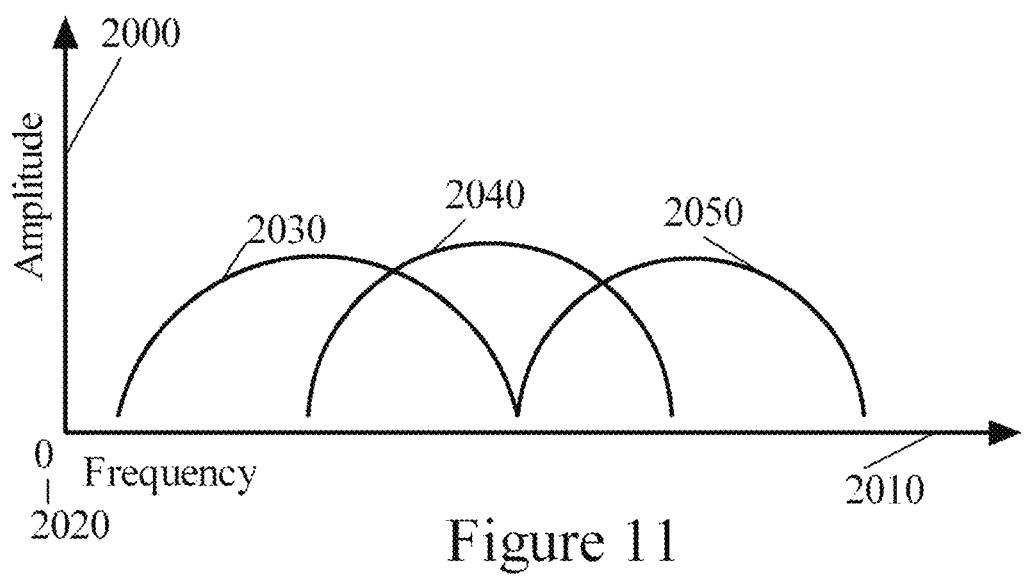
FIG. 11 is an example diagram of the possible bandwidth contributions of the third embodiment of the invention found in FIGS. 8 through 10, consisting of multiple embodiments of the preferred embodiment of the invention of FIGS. 2, 4, and 6.

FIG. 11 is an example of this bandwidth adjustability. In FIG. 11, signal amplitude or magnitude 2000 is shown on the vertical axis of the graph. Signal frequency 2010 is shown on the horizontal axis of the graph. Zero amplitude-magnitude and frequency is found at the intersection of the two axis, denoted by 2020. Frequency/amplitude-magnitude example plots 2030, 2040, and 2050 show possible, but not exclusive, bandwidths/amplitude-magnitudes that any of the Reservoir Recovery Energy Flux Coupling Cell 200 of Multiple Reservoir Recovery Energy Flux Coupling System 1000 of FIGS. 8 through 10, might assume.

Figure 12:
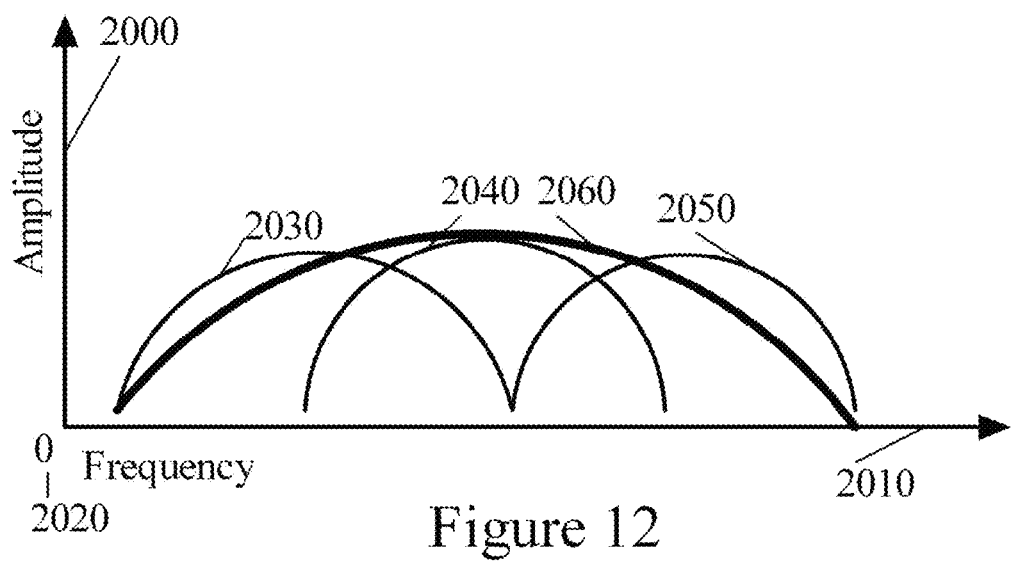
FIG. 12 is an example diagram of the composite bandwidth contributions of the third embodiment of the invention found in FIGS. 8 through 10, consisting of multiple embodiments of the preferred embodiment of the invention of FIGS. 2, 4, and 6.

FIG. 12 shows the same plot as FIG. 11, with the addition of composite bandwidth/amplitude-magnitude plot 2060. This example, non-exclusive, composite plot is representative of the composite signal found at port 160 of Multiple Reservoir Recovery Energy Flux Coupling System 1000 of FIGS. 8 through 10, and is the result of the individual frequency amplitude-magnitude contributions of Reservoir Recovery Energy Flux Coupling Cells 200 of Multiple Reservoir Recovery Energy Flux Coupling System 1000.

The structure supporting this bandwidth/magnitude-amplitude adjustability is shown as bandwidth adjusting device 101 of bandwidth-amplitude shifting rectification device (BASRD) 100 of each of the Reservoir Recovery Energy Flux Coupling Cells 200, shown in FIGS. 1 through 6, and embedded in Multiple Reservoir Recovery Energy Flux Coupling System 1000, shown in FIGS. 8 through 10.

Bandwidth/magnitude-amplitude adjustment means 500 for Reservoir Recovery Energy Flux Coupling Cells 200 is driven by connecting wire 510 and adjustment port 520. Multiple Reservoir Recovery Energy Flux Coupling System 1000 adjustment port 520 is a digital control port wide enough to individually tune all the individual Reservoir Recovery Energy Flux Coupling Cells 200 of Multiple Reservoir Recovery Energy Flux Coupling System 1000.

It is noted that bandwidth/magnitude-amplitude adjustment port 520 of Reservoir Recovery Energy Flux Coupling Cells 200 of Multiple Reservoir Recovery Energy Flux Coupling System 1000 can be driven in any manner, identically, independently, or in any combination to obtain any needed composite bandwidth.

One skilled in the art will appreciate that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A High Frequency Impulse Current Reservoir Recovery Energy Flux Device comprising:
   an input and an output;
   a first Reservoir Recovery Flux Coupling System, comprising:
   an input of the first Reservoir Recovery Flux Coupling System;
   an output of the first Reservoir Recovery Flux Coupling System;
   a first output connector;
   an input of the first output connector;
   an output of the first output connector;
   a first input AC coupler possessing charge reservoir storage capability;
   an input of the first input AC coupler;
   an output of the first input AC coupler;
   a first High Impedance Biasing Device (HIBD);
   an input of the first HIBD;
   an output of the first HIBD;
   a first Reservoir Recovery Energy Flux Coupling Unit;
   an input of the first Reservoir Recovery Energy Flux Coupling Unit;
   an output of the first Reservoir Recovery Energy Flux Coupling Unit;
   a first Reservoir Recovery Energy Flux Coupling Cell;
   an input of the first Reservoir Recovery Energy Flux Coupling Cell; and
   an output of the first Reservoir Recovery Energy Flux Coupling Cell;
   the first output connector input connected to the input of the first input AC coupler;
   the first output connector input and the input of the first input AC Coupler connected to the input of the first Reservoir Recovery Flux Coupling System;
   the first output connector output and the first HIBD output connected to the output of the first Reservoir Recovery Energy Flux Coupling Unit;
   the first input AC coupler input connected to the input of the first Reservoir Recovery Energy Flux Coupling Unit;
   the first Reservoir Recovery Energy Flux Coupling Cell input connected to the output of the first input AC coupler; the first Reservoir Recovery Energy Flux Coupling Cell output connected to the output of the first output connector and the first HIBD;
   the HIBD input connected to a biasing voltage or system ground;

the first Reservoir Recovery Energy Flux Coupling Cell, the first Reservoir Recovery Energy Flux Coupling Unit, and the first Reservoir Recovery Energy Flux Coupling System coupled to a ground reference;

the first input AC coupler supplying stored reservoir flux in a form of electrical charge and current to the input of the first Reservoir Recovery Energy Flux Coupling Cell;

the stored electrical reservoir flux, charge, and current being created by an applied system input excitation impulse voltage that is transferred to the input of the first Reservoir Recovery Flux Coupling System, the applied input excitation impulse voltage transferred to the input of the first output connector, which is output connected to the output of the first Reservoir Recovery Energy Flux Coupling Unit and the output of the first HIBD;

the first output connector and the first HIBD, transferring the system excitation impulse voltage to the output of the first Reservoir Recovery Energy Flux Coupling Cell, the system input excitation impulse voltage transferred by the first output connector and the first HIBD, and the energy generated by the stored input reservoir flux, charge, and current contained in the first input AC coupler, combining with the transferred system input excitation impulse voltage, generating output impulse currents, thus transferring the reservoir flux, charge, and current originating in the first input AC Coupler to the output of the first Reservoir Recovery Energy Flux Coupling Unit, the transferred input reservoir flux, charge, and current stored originally in the first input AC coupler partially cancelling the transferred input excitation impulse voltage by the first output connector, injecting created first Reservoir Recovery Flux Coupling System current, via the first connector, to be summed with the originating source excitation AC currents;

wherein the currents traveling in the same conductor and to the input and output in the first Reservoir Recovery Flux Coupling System, increasing demanded load current, thereby reducing the supply current demanded from system supplies.

2. A High Frequency Impulse Current Reservoir Recovery Energy Flux Device comprising:

an input and an output;

a first Reservoir Recovery Flux Coupling System comprising:

an input of the first Reservoir Recovery Flux Coupling System;

an output of the first Reservoir Recovery Flux Coupling System;

a first output connector;

an input of the first output connector;

an output of the first output connector;

a first input AC coupler possessing charge reservoir storage capability;

an input of the first AC coupler;

an output of the first AC coupler;

a first High Impedance Biasing Device (HIBD);

an input of the first HIBD;

an output of the first HIBD;

a first Reservoir Recovery Energy Flux Coupling Cell;

an input of the first Reservoir Recovery Energy Flux Coupling Cell;

an output of the first Reservoir Recovery Energy Flux Coupling Cell;

a second Reservoir Recovery Energy Flux Coupling Cell;

an input of the second Reservoir Recovery Energy Flux Coupling Cell;

an output of the second Reservoir Recovery Energy Flux Coupling Cell;

the first Reservoir Recovery Energy Flux Coupling Cell comprising a first input alternating current input device (ACID), the first ACID having an input and an output;

the second Reservoir Recovery Energy Flux Coupling Cell comprising a second ACID, the second ACID having an input and an output;

the first output connector input connected to the input of the first AC coupler;

the first output connector input and the first AC Coupler input connected to the input of the first Reservoir Recovery Flux Coupling System;

the first output connector output and the first HIBD output connected to the output of the first or second Reservoir Recovery Energy Flux Coupling Cell;

the first input AC coupler input connected to the input of the first Reservoir Recovery Energy Flux Coupling System;

the first or second Reservoir Recovery Energy Flux Coupling Cell input connected to the output of the first input AC coupler;

the first or second Reservoir Recovery Energy Flux Coupling Cell output connected to the output of the first output connector and the output of the first HIBD;

the first HIBD input connected to a biasing voltage or system ground;

the first and second Reservoir Recovery Energy Flux Coupling Cell and Reservoir Recovery Energy Flux Coupling System connected to a ground reference;

the first input ACID input connected to the input of the first Reservoir Recovery Energy Flux Coupling Cell and the output of the first AC coupler, and the first input ACID output connected to system ground or a reference, so as to cause arbitrary current flow;

the second Reservoir Recovery Energy Flux Coupling Cell connected to a ground reference;

the second input ACID connected to the input of the second Reservoir Recovery Energy Flux Coupling Cell and the output of the first AC coupler, the second input ACID output connected to system ground or a reference, so as to cause opposite current flow with respect to the first input ACID;

the first input AC coupler possessing charge reservoir storage capability, supplying stored reservoir flux in a form of electrical charge and current to the inputs of the first and second Reservoir Recovery Energy Flux Coupling Cells, the second input ACID input connected in such a manner so as to create opposite flowing currents with respect to the first ACID current flow;

the first output connector output and the first HIBD output are connected to the output of the first and second Reservoir Recovery Energy Flux Coupling Cells;

the first output connector and the first HIBD transferring the system excitation impulse voltage to the output of the first or second Reservoir Recovery Energy Flux Coupling Cell;

the transferred input reservoir flux, charge, and current stored originally in the first input AC coupler, transferred to the inputs and ACIDs of all Reservoir Recovery Energy Flux Coupling Cells partially cancelling the first transferred system excitation impulse voltage by the first connector and the first HIBD, injecting created first Reservoir Recovery Flux Coupling System current, via the said first connector, to be summed with the originating source excitation AC currents;

the currents traveling in the same conductor and to the input and output of the first Reservoir Recovery Flux Coupling System, increasing demanded load current, thereby reducing the supply current demanded from system supplies.

3. The High Frequency Impulse Current Reservoir Recovery Energy Flux Device of claim 2, wherein the first AC coupler comprises a capacitor or the junction/barrier capacitance of a device.

4. The High Frequency Impulse Current Reservoir Recovery Energy Flux Device of claim 2, wherein the first AC coupler comprises an inductor or the parasitic inductance of a device.

5. The High Frequency Impulse Current Reservoir Recovery Energy Flux Device of claim 2, wherein the first AC coupler comprises a wire.

6. The High Frequency Impulse Current Reservoir Recovery Energy Flux Device of claim 2, wherein the first output connector comprises a capacitor or the junction/barrier capacitance of a device.

7. The High Frequency Impulse Current Reservoir Recovery Energy Flux Device of claim 2, wherein the first output connector comprises an inductor or the parasitic inductance of a device.

8. The High Frequency Impulse Current Reservoir Recovery Energy Flux Device of claim 2, wherein the first output connector comprises a wire.

9. The High Frequency Impulse Current Reservoir Recovery Energy Flux Device of claim 2, wherein the first HIBD comprises a resistor or resistive device.

10. The High Frequency Impulse Current Reservoir Recovery Energy Flux Device of claim 2, wherein the first HIBD comprises an inductor or the parasitic inductance of a device.

11. The High Frequency Impulse Current Reservoir Recovery Energy Flux Device of claim 2, wherein the first HIBD comprises a capacitor or the junction/barrier capacitance of a device.

12. The High Frequency Impulse Current Reservoir Recovery Energy Flux Device of claim 2, wherein:

the first Reservoir Recovery Energy Flux Coupling Cell further comprises a first Energy Flux receiving device (EFRD) and a first bandwidth-amplitude shifting rectification device (BASRD);

the second Reservoir Recovery Energy Flux Coupling Cell further comprises a second EFRD and a second BASRD;

wherein, the first or second BASRD comprises non-impedance matched RLC networks, the RLC networks comprising bandwidth selecting devices and junction diodes of any type, diode connected FETs of any type, or any other devices that perform a current injection function;

wherein, if the first or second Reservoir Recovery Energy Flux Coupling Cell comprises a first or second ACID, and the first or second EFRD comprises inductors, current transformers, baluns, or inductive devices, and the first or second EFRD comprises the inductances and primary resistances of the RLC networks, the bandwidth selecting devices further comprising capacitors, devices with capacitive characteristics, or parasitic capacitances, and/or resistances, that drive junction diodes of any type, diode connected FETs of any type, or any other device that performs the current injection function; and wherein, if the first or second Reservoir Recovery Energy Flux Coupling Cells comprises the first or second ACID, and the first or second EFRD comprises capacitors, devices with capacitive characteristics, or parasitic capacitances, and/or resistances, the first or second EFRD comprises the capacitances of the RLC networks, the bandwidth controlling devices further consisting of inductors, current transformers, baluns, or inductive devices, and/or resistances, that drive junction diodes of any type, diode connected FETs of any type, or any other devices that performs a current injection function.

13. The High Frequency Impulse Current Reservoir Recovery Energy Flux Device of claim 2, wherein:

the first Reservoir Recovery Energy Flux Coupling Cell further comprises a first Energy Flux receiving device (EFRD);

the second Reservoir Recovery Energy Flux Coupling Cell further comprises a second EFRD;

the first ACID and the second ACID comprise inductors, current transformer primary windings, balun primary windings, or inductive devices; and the first EFRD and the second EFRD comprise inductors, multiple (n) inductors, current transformers secondary windings, balun secondary windings, or inductive devices.

14. The High Frequency Impulse Current Reservoir Recovery Energy Flux Device of claim 2, wherein the first Reservoir Recovery Energy Flux Coupling Cell further comprises a first Energy Flux receiving device (EFRD);

the second Reservoir Recovery Energy Flux Coupling Cell further comprises a second EFRD;

the first ACID, the second ACID, the first EFRD, and the second EFRD comprise the plates of capacitors, devices with capacitive characteristics, or parasitic capacitances.

15. The High Frequency Impulse Current Reservoir Recovery Energy Flux Device of claim 2, wherein:

the first Reservoir Recovery Energy Flux Coupling Cell further comprises a first Energy Flux receiving device (EFRD);

the second Reservoir Recovery Energy Flux Coupling Cell further comprises a second EFRD;

wherein the first or second ACID comprises inductors, current transformers, baluns, or inductive devices;

wherein the first or second EFRD comprises inductive element secondary windings, current transformer secondary windings, or balun secondary windings;

wherein the first or second ACID further comprises inductive primary windings, current transformer primary windings, or balun primary windings that are included in an integrated circuit, are planar and are micro-meters in scale, with substantially larger physical widths or substantially lower self-inductances as compared to the first or second EFRD inductive element secondary windings, current transformer secondary windings, or balun secondary windings; and wherein the first or second EFRD inductive element secondary windings, current transformer secondary windings, or balun secondary windings are included in an integrated circuit, are planar, and are micro-meters in scale, and have substantially smaller physical widths or substantially higher self-inductances than inductive elements of the first or second ACID.

16. The High Frequency Impulse Current Reservoir Recovery Energy Flux Device of claim 2, wherein:

the first ACID comprises an inductive element, current transformer, or balun, possessing an arbitrary directional current flow; and the second Reservoir Recovery Energy Flux Coupling Cell further comprises a plurality of ACID, comprising one or more inductive element(s), current transformer primary(s), or balun primary(s) in micro-meter proximity to the first ACID, wherein the plurality of ACIDs, comprising one or more inductive element(s), current transformer primary(s), or balun primary(s) possessing opposing or opposite direction current flow, relative to the first ACID, the opposite current flows being generated by originating input charge and current input from the first AC coupler in the Reservoir Recovery Energy Flux Coupling System.

17. A Method of Recovering Energy and High Frequency Impulse Currents comprising:

an admission of reservoir current from a source to an input of a reservoir recovery system;

a source voltage that created the admitted reservoir current transferred to an output of the reservoir recovery system;

a transferred voltage, input reservoir current, and electrical flux, causing internal, instantaneous high frequency, forced impulse current to be injected in a uni-polar direction, to the output of the reservoir recovery system;

a current partially cancelling the said transferred voltage and a remainder of the generated, high frequency impulse current added and summed to system current or charge load demands;

reducing a magnitude of the originating high frequency impulse currents and voltages applied to the input and output of the recovery system, respectively; and decreasing the current or charge demands from a system power source;

whereby originating High Frequency Impulse, varying polarity, phase, and magnitude current and voltage signals, are applied to the input and output of a reservoir recovery system;

the admission of reservoir current from a source to the input of a reservoir recovery system;

the source voltage that created the reservoir current transferred to the output of the reservoir recovery system;

the transferred voltage, input reservoir current, and electrical flux causing internal, instantaneous high frequency, forced impulse current to be injected in a uni-polar direction to the output of the reservoir recovery system;

the current partially cancelling the said transferred voltage and the remainder of the generated, high frequency impulse current added and summed to system current or charge load demands;

reducing the magnitude of the originating high frequency impulse currents and voltages applied to the input and output of the recovery system, respectively; and decreasing the current or charge demands from a system power source.

18. The method according to claim 17:

wherein the internal, instantaneous high frequency impulse current or charge directed to flow in a uni-polar direction, is utilized to reduce input High Frequency Impulse current and energy flux and/or charge an external storage device.

* * * * *